United States Patent [19]
Palmer

[11] Patent Number: 5,455,711
[45] Date of Patent: Oct. 3, 1995

[54] MAGNIFICATION LENS COUPLING DEVICE FOR A NIGHT VISION ASSEMBLY

[75] Inventor: Gary L. Palmer, Bellevue, Wash.

[73] Assignee: ITT Corporation, New York, N.Y.

[21] Appl. No.: 396,269

[22] Filed: Feb. 28, 1995

Related U.S. Application Data

[63] Continuation of Ser. No. 208,392, Mar. 8, 1994, abandoned.

[51] Int. Cl.$^6$ .............................. G02B 5/00; G02B 7/00; G02B 23/00
[52] U.S. Cl. ...................... 359/353; 359/418; 359/744; 359/827; 359/822
[58] Field of Search .................................. 359/827, 829, 359/811, 409, 354, 828, 819, 822, 811, 480, 481, 894, 822, 823, 825, 425, 428, 399, 365, 403, 407, 356, 418, 409, 633, 353, 744

[56] References Cited

U.S. PATENT DOCUMENTS

| | | | |
|---|---|---|---|
| 2,853,925 | 9/1958 | Lee | 359/827 |
| 2,953,970 | 9/1960 | Maynard | 359/827 |
| 3,048,079 | 8/1962 | Dine et al. | 359/827 |
| 4,822,994 | 4/1989 | Johnson et al. | 359/353 |
| 4,893,143 | 1/1990 | Wey | 359/827 |
| 5,204,774 | 4/1993 | Owen et al. | 359/409 |
| 5,311,358 | 5/1994 | Pederson et al. | 359/510 |

*Primary Examiner*—Paul M. Dzierzynski
*Assistant Examiner*—Audrey Chang
*Attorney, Agent, or Firm*—Arthur L. Plevy; Patrick M. Hogan

[57] ABSTRACT

A coupling device and associated method for coupling an unassociated afocal optical assembly to a night vision apparatus in order to alter the optical power normally associated with the night vision. The coupling device includes two separate adapter rings that threadably connect to each other. The first adaptor ring is sized and shaped to threadably engage the night vision apparatus proximate the objective lens of the night vision apparatus. The second adaptor ring is sized and shaped to screw onto the output end of the afocal optical assembly. Accordingly, when the first adaptor ring is joined to the second adaptor ring, the output end of the afocal optical assembly is optically aligned with the objective lens of the night vision apparatus. Consequently, the afocal optical assembly enhances the optical power associated with the night vision apparatus.

15 Claims, 2 Drawing Sheets

MAGNIFICATION LENS COUPLING DEVICE FOR A NIGHT VISION ASSEMBLY

This is a continuation of application Ser. No. 08/208,392, filed on Mar. 8, 1994, entitled MAGNIFICATION LENS COUPLING DEVICE FOR A NIGHT VISION ASSEMBLY, now abandoned.

BACKGROUND OF THE INVENTION

I. Field of the Invention

The present invention relates to coupling devices that enable various premanufactured magnifying lens arrangements to be coupled to a night vision device, thereby increasing the power of magnification for the night vision device. More specifically, the present invention relates to a modular coupling system wherein various magnifying lens arrangement for differing shapes and sizes and from different manufactures can be simply and easily coupled to an unassociated night vision assembly.

II. Prior Art Statement

Many types of optical devices, such as cameras, video cameras, projectors and the like include a threaded aperture surrounds the objective lens of that device. The presence of the threaded aperture enables secondary optical devices to be attached in front of the objective lens along the optical path of the optical device. For instance, many cameras have objective lenses that are adapted to receive various wide-angle, telescopic and/or light filter arrangements. Similarly, night vision devices are also commercially available that can be directly mounted to a camera, video camera or the like, so that pictures can be taken during night time or other low light conditions. In view of the multitude of optical devices that can be selectively attached to the various cameras, video cam recorders and the like, it will be understood that a large number of coupling devices exist in the prior art. However, there are no standards to which the all couplings conform. Consequently, each manufacturer may require a different unique coupling device to join any given peripheral device to any given optical assembly. The complexity of the field of optical component adapters becomes even more apparent when it is recognized that many optical assemblies require bayonet style connectors while still others require screw type connectors. As a result, whenever a person buys a secondary optical device to join to a specific camera, VCR or the like, that person must buy a specific coupling adaptor to properly join those two components together. That coupling is typically designed specifically for that secondary optical device and does not fit any other secondary optical device that may be available from another manufacturer.

Finding the proper coupling device for popular cameras and popular lens systems is not difficult. However for specialty optics, such as night vision assemblies, the task becomes far more complex. First, night vision devices do not have a single focus system as do most cameras, telescopes and the like, (i.e., the objective lens focuses the image onto the film or at the ocular). Rather, most night vision devices have double focus system where, first, the objective lens focuses light onto an image intensifier tube and second the image made by the tube is focused at the ocular. Accordingly, unassociated lens arrangements cannot be randomly attached to night vision devices if those lens arrangements change the objective lens focus beyond the range of adjustment embodied by the optics of the night vision device. As such, in many prior art night vision devices the optics between the objective lens and the image intensifier tube must be changed with customized optics in order to properly change the optical power of the night vision device. Many night vision devices must therefore be fully disassembled and reassembled in order to change the power of magnification for the assembly. As a consequence of such a complicated optical configuration, many night vision devices do not even provide a means to connect a secondary optical assembly to the night vision device. Other night vision devices that do have removable telescopic assemblies utilize custom telescopic assemblies that are specifically designed to be compatible to the remaining optics in the night vision device.

Another problem incurred when attempting to attach unassociated commercial lens assemblies to night vision devices is that night vision devices have small objective lenses as compared to cameras, video cameras and the like. For example many 35 mm cameras have objective lenses with diameters in the range of 50 mm. As such, any secondary optics made to be added to such a camera also are typically in the 50 mm range. Alternatively, night vision devices that utilize a Generation III image intensifier tube typically only have an objective lens in the 25 mm range, which is about half of that of the camera. Accordingly, the size of the night vision devices is often too small to enable a typical camera lens to be coupled to it. Similarly, the size differentials between the camera lenses and the night vision device result in an incompatible optical arrangement.

Since night vision devices either embody no coupling means for external optics or embody customized optical arrangements for specialized external optics, there is no way available to join unassociated commercially available lens arrangements to a night vision assembly. This is true simply because if an unassociated commercially available lens arrangement were joined to a night vision assembly, it would probably have an incompatible optical design and would not work. As a result, no coupling devices have been needed.

An exception to the general rule that external lens arrangements are incompatible with night vision assemblies occurs when the external lens arrangement creates a collimated or otherwise a focal image. In such a circumstance the light entering the night vision device is generally parallel and does not produce an adverse effect upon the optical design of the night vision device. There are commercially available telescopic lenses available in the prior art that create a generally a focal output. However, each such telescopic lens is unique with its own shape, size and coupling system, most all of which are incompatible with the night vision device.

It is therefore the objective of the present invention to provide a modular coupling device whereby unassociated a focal telescopic lens arrangements can be quickly and economically coupled to a night vision device, thereby selectively changing the optical power of the night vision device.

It is a further objective of the present invention to provide for a night vision device with a modular secondary lens system, whereby the optical power of the night vision device can be changed by selectively replacing an external supplemental lens system coupled to the night vision device.

SUMMARY

A coupling device and associated method for coupling an unassociated afocal optical assembly to a night vision apparatus in order to alter the optical power normally associated with the night vision. The coupling device includes two separate adapter rings that threadably connect to each other.

The first adaptor ring is sized and shaped to screw onto the night vision apparatus proximate the objective lens of the night vision apparatus. The second adaptor ring is sized and shaped to screw onto the output end of the afocal optical assembly. Accordingly, when the first adaptor ring is joined to the second adaptor ring, the output end of the afocal optical assembly is optically aligned with the objective lens of the night vision apparatus. Consequently, the afocal optical assembly enhances the optical power associated with the night vision apparatus.

Afocal optical assembles come in a large number of shapes and sizes depending upon the model and manufacturer. As a result, multiple second adaptor rings may be provided whereby each adaptor ring is shaped and sized to accommodate a different type of afocal optical assembly. Each of the second adaptor rings attaches in the same manner to the first adaptor ring and therefore the night vision apparatus. According, only the second adaptor rings needs to be replaced should a different afocal lens assembly be used.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Figure 1:
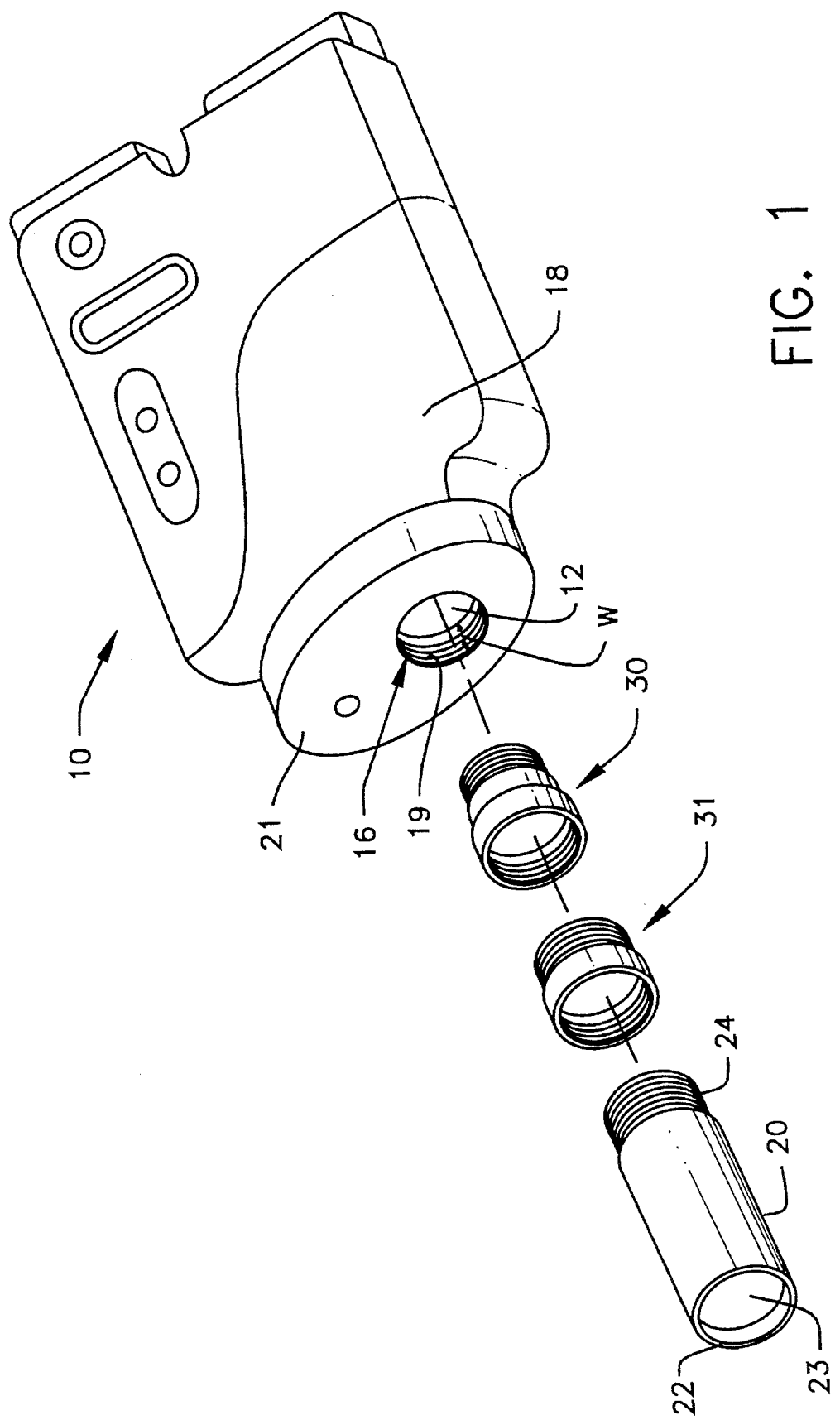
FIG. 1 shows an exploded perspective view of one preferred embodiment of the present invention used to join a night vision device to an afocal optical assembly.

Referring to FIG. 1 a night vision assembly 10 is shown that has a single objective lens 12. The night vision assembly 10 shown is of the type described in U.S. patent application Ser. No. 08/152,193, filed Nov. 12, 1993, entitled NIGHT VISION BINOCULARS and assigned to ITT Corporation the assignee herein. For the purposes of explaining the form and function of a night vision device, the disclosure of the 193 application is incorporated into this application by reference.

The objective lens 12 of the night vision assembly 12 receives impinging infrared radiation through an aperture 16 formed in the housing 18 of the night vision assembly 10. The aperture 16 is approximately 30 millimeters in diameter having a threaded interior surface 19. The threaded interior surface 19 has a width w of between 3 mm and 6 mm that extends from the from surface 21 of the housing 18 back to the objective lens 12.

An afocal magnifying lens assembly 20 is provided from a commercial source unassociated with the night vision assembly 10. The afocal lens assembly 20 has a proximal end 22 that contains the magnifying objective lens 23 and a distal end 24, that is adapted to be joined to a specific optical device, such as a camera, other than the night vision assembly 10. The proximal end 22 of the afocal lens assembly 20, therefore, includes either a threaded coupling or a bayonet coupling to facilitate the joining of the afocal lens assembly 20 to a second device. Afocal lens assemblies of various powers of magnification are widely available from many manufacturers of camera lens and telescope lens assemblies. For example, a 3× telephoto lens model VSL39 is manufactured by LENMAR ENTERPRISES, INC. of Westlake Village, Calif. The Lenmar telephoto lens comes with a dual direct threaded fitting that enables the telephoto lens to join to a 49 millimeter diameter aperture on a video cam recorder. As the Lenmar telephoto lens exemplifies, commercially available afocal lens assemblies typically have a diameter that is too large to join directly to night vision assembly 10. This is because commercial afocal lens assemblies are typically made for widely used optical devices such as cameras and video cam recorders that use much wider optics than do most night vision devices. Also the threading coupling or bayonet coupling provided at the distal end 24 of the afocal lens assembly 20 is also typically incompatible with the threaded aperture 16 on the housing 18 of the night vision device 10. Accordingly, even of the distal end 24 of the afocal lens assembly 20 had a diameter that matched the threaded aperture 16 of the night vision device 10, the incompatible thread design on each would prevent the two components from being joined.

Figure 2:
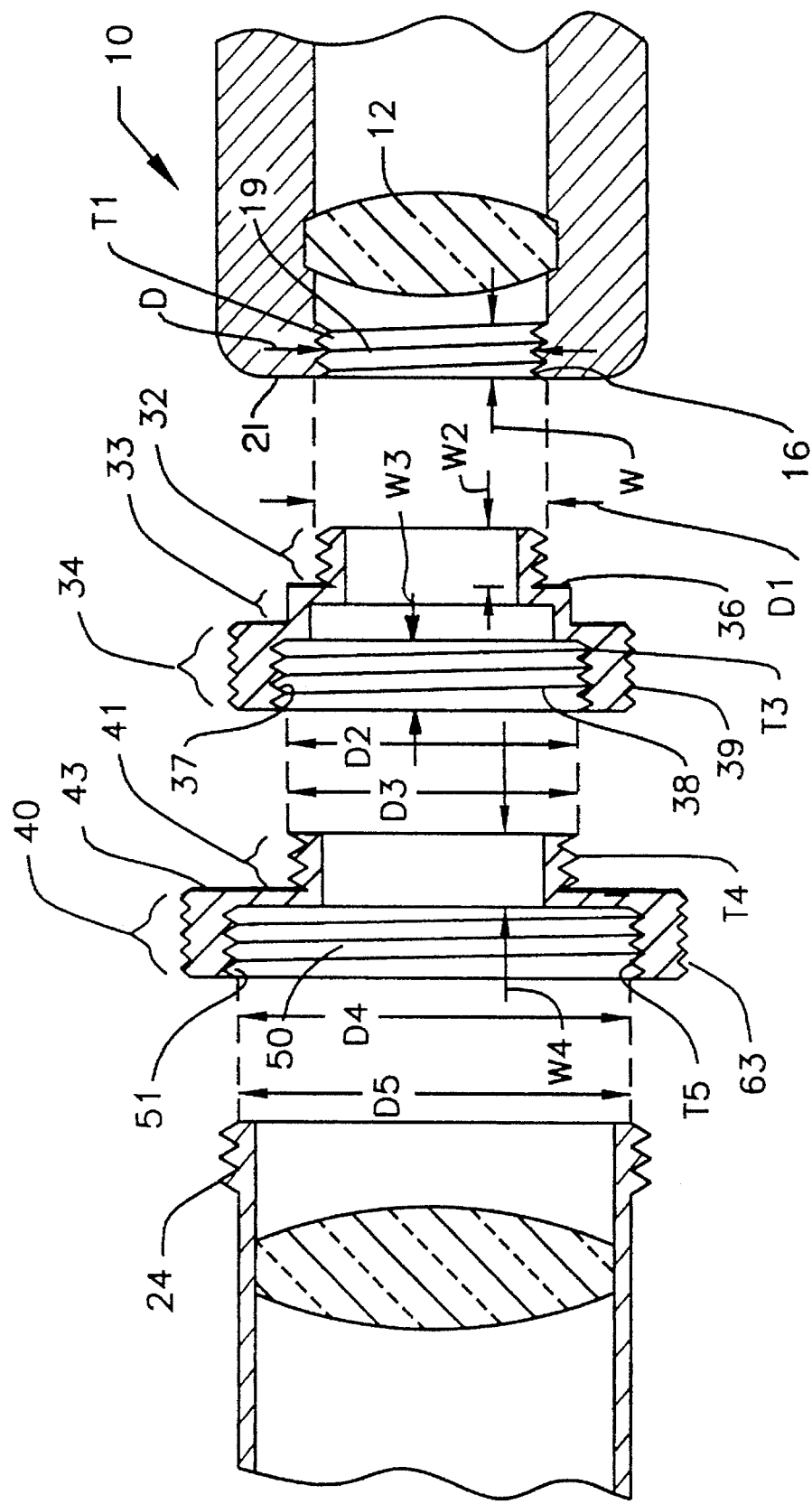
FIG. 2 shows a segmented cross-sectional view of the embodiment of FIG. 1, viewed along section line 2—2 to facilitate consideration and discussion.

In FIG. 1 the afocal magnifying lens assembly 20 is joined to the night vision assembly 10 utilized two adaptor rings 30, 31. The first ring is a universal adaptor ring 30 that couples to the night vision assembly 10 as will be later explained. The second ring is a modular adaptor ring 31 that interconnects with the adaptor ring 30 and is adapted to receive the distal end 24 of the afocal magnifying lens assembly 20 thereby acting to couple the afocal magnifying lens assembly 20 to the night vision assembly 10. Referring to FIG. 2 in conjunction with FIG. 1, it can be seen that the threaded aperture 16 has a diameter D of approximately 30 millimeters. The threaded interior surface 19 that defines the aperture 16 has a width W and contains a taped screw thread T1 of a first thread size and pitch.

The universal adaptor ring 30 has a stepped exterior surface, having three distinct outer regions 32, 33, 34 each of which had a different diameter. The first region 32 of the adaptor ring 30 has a diameter D1 that generally matches the diameter D of the aperture 16 in the night vision assembly 10. The exterior of the first region 32 is threaded, having threads T2 with a thread size and pitch that generally match the threads T1 present on the interior surface 19 defining the aperture 16. As a result, the first region 32 of the universal adaptor ring 30 may be threaded into the aperture 16 of the night vision device 10, thereby joining the universal adaptor ring 30 to the night vision device 30. The width W2 of the first region 32 of the universal adaptor ring 30 is slightly smaller than the width W of the threaded interior surface 19 defining the aperture 16. As such, when the universal adaptor ring 30 is threaded onto the night vision device 10, the vertical surface 36 of the second region 33 abuts against the front surface 21 of the night vision housing 18. This provides support that helps relieve the full weight of the supported afocal magnifying lens assembly 20 from acting solely upon the threads T2 of the first region 32 of the universal adaptor ring 30.

The third region 34 of the universal adaptor ring 30 has a threaded inner surface 37 that defines an aperture 38 with a diameter D2. The inner surface 37 preferably has a width W3 of between two millimeters and five millimeters. Furthermore the diameter D2 of the threaded aperture 38 is approximately 37 millimeters. The threads T3 on the inner surface 37 of the third region 34 have a predetermined thread size and pitch. The exterior surface 39 of the third region 34 is knurled to provide a grippable surface, whereby the universal adaptor ring 30 can be easily threaded into the aperture 16 on the night vision device 10.

The second region 33 of the universal adaptor ring 30 serves as a transition region between the exteriorly threaded first region 32 and the interiorly threaded third region 34. As was before explained the external vertical surface 36 of the second region 33 serves as a stop against the over advancement of the first region 32 into the night vision device 10.

The modular adaptor ring 31 has two regions 40, 41. The first region 41 has a diameter D3 that is generally equivalent to the diameter D2 of the aperture 38 in the third region 34 of the universal adaptor ring 30. The exterior of the first region 41 is threaded, having, threads T4 with a thread size and pitch that generally match the threads T3 present on within the aperture 38 of the third region 34 of the universal adaptor ring 30. As a result, the first region 41 of the modular adaptor ring 31 may be threaded into the aperture 38 of the universal adaptor ring 30, thereby joining the modular adaptor ring 31 to the universal adaptor ring 30. The width W4 of the first region 41 of the modular adaptor ring 31 is slightly smaller than the width W3 of the threaded interior surface 37 of the third region 34 of the universal adaptor ring 30. As a result, when the modular adaptor ring 31 is threaded onto the universal adaptor ring 30, the vertical surface 43 of the second region 40 of the modular adaptor ring 31 abuts against the third region 34 of the universal adaptor ring 30. This abutment provides support that relieves the force of the weight of the afocal magnifying lens assembly 20 from acting solely upon the threads within the coupling.

The second region 40 of the modular adaptor ring 31 has an interior surface 51 that defines an aperture 50 with a diameter D4. In the shown embodiment, the interior surface 51 contains an internal thread T5 of a predetermined thread size and pitch. However as will be explained, the interior surface 51 of the second region 40 may embody a bayonet coupling. The interior surface 51 of the second region 40 is the portion of the modular adaptor ring 31 that actually engages the afocal magnifying lens assembly 20. As such, multiple modular adaptor rings are provided, each of which attaches to the same universal adaptor ring 30.

As has been previously explained, afocal magnifying lens assemblies come in a wide variety of sizes with both threaded couplings and bayonet style couplings. Modular adaptor rings are provided for each major type and size of these afocal magnifying lens assemblies. The interior surface 51 of the second region 40 is therefore formed to accept the threaded or bayonet coupling of one major type of afocal magnifying lens assembly. For instance in the shown embodiment the afocal magnifying lens assembly 20 has a threaded distal end 24 with a diameter D5 that is generally equivalent to the diameter D4 of the aperture 50 in the second region 40 of the modular adaptor ring 31. As a result, the distal end 24 of the afocal magnifying lens assembly 20 can be coupled to the modular adaptor ring 31. The modular adaptor ring 31 can then be coupled to the universal adapter ring 30, thereby joining the afocal magnifying lens assembly 20 to the night vision assembly 10.

The exterior surface 63 of the second region 40 of the modular adaptor ring 31 is knurled. As a result, a grippable, non-slip surface is provided that enables the modular adaptor ring 31 to be easily rotated.

In the shown embodiment of FIG. 2, the diameter D4 of the aperture 50 in the second region 40 of the modular adaptor ring 31 is preferably 47 millimeters to correspond to the large number of commercially available afocal magnifying lens assemblies that have a diameter of 47 millimeters at their distal ends. However, other sized modular adaptor rings can be provided where the diameter D4 of the aperture 50 is either 46 millimeters, 49 millimeters, 52 millimeters or 55 millimeters. By providing modular adaptor rings in these sizes the majority of commercially available afocal magnifying lens assemblies can be coupled to the night vision assembly 10.

The use of both the universal adapter ring 30 and the modular adaptor ring 31 provides for an easy and cost economical way to couple various unrelated afocal magnifying lens assemblies to the night vision assembly. Since the universal adaptor ring 30 is constant, only the modular adaptor ring 31 needs to be changed should a different afocal lens arrangement be used. This two part modular system is therefore much cheaper and easier to manufacture than a large complex one piece adaptor ring device where the entire ring must be changed each time the afocal lens arrangement is changed.

It will be understood that the present invention described in conjunction with the various drawings are merely exemplary and a person skilled in the art of threaded couplings may make numerous variations and modifications to the shown embodiments utilizing functionally equivalent features to those described, as such, such changes in scale, orientation and appearance can be made. All such variations and modifications are intended to be included within the scope of this invention as defined by the appended claims.

What is claimed is:

1. An optical assembly, comprising:

a night vision device of a predetermined optical power, having an objective lens disposed upon an optical path within a housing, said housing defining an opening through an external surface of said housing, wherein the opening enables light from a source external of said housing to impinge upon said objective lens;

an afocal lens assembly having a predetermined power of magnification; and coupling means for coupling said afocal lens assembly to said external surface of said housing, wherein said afocal lens assembly magnifies the light entering said objective lens through the opening and increases said optical power of said night vision device.

2. The assembly according to claim 1, wherein the opening in the night vision device is a threaded aperture of a first thread size and pitch and the afocal lens assembly has a second thread size and pitch incompatible with the first thread size and pitch.

3. The device according to claim 2, wherein said coupling device includes:

a first adaptor ring having a first region of a first diameter with an external thread that corresponds to the first thread size and pitch of the threaded aperture on the night vision device, a second region of a second diameter having an internal thread of a predetermined size and pitch, and a transition region having a diameter larger than said first diameter and no larger than said second diameter, wherein said transition region abuts against the forward surface of the night vision device when said first region of said first adaptor ring is threadably engaged in said threaded aperture, thereby transferring a stress applied to said first adaptor ring to the external surface of the night vision device; and a second adaptor ring having a first region with an external thread that corresponds to said predetermined size and pitch of said internal thread in said first adaptor ring, and a second region having an internal thread that corresponds to the second thread size and pitch of the afocal lens assembly, whereby said first region on said second adaptor ring can be threadably coupled to said second region of said first adaptor ring and the afocal lens assembly can be threadably coupled to said second region of said second adaptor ring.

4. The device according to claim 3, wherein said second region of said first adaptor ring has a knurled outer surface and said second region of said second adaptor ring has a knurled outer surface.

5. The device according to claim 3, wherein said second region of said second adaptor ring defines a threaded aperture having a diameter of between 46 millimeters and 55 millimeters.

6. The device according to claim 3, wherein said second region of said first adaptor ring abuts against said second region of said second adaptor ring as said first adaptor ring and said second adaptor ring are threadably coupled, thereby preventing the further advancement of said first adaptor ring to said second adaptor ring beyond a predetermined position.

7. The device according to claim 3, wherein said first region of said second adaptor ring has a width less than the width associated with said second region of said first adaptor ring, whereby said second region of said second adaptor ring abuts against said second region of said first adaptor ring as said second adaptor ring is threadably joined to said first adaptor ring.

8. The assembly according to claim 7 wherein said coupling means includes a first adaptor ring that joins to said night vision device and a second adaptor ring that joins to said afocal lens assembly wherein said first adaptor ring threadably engages said second adaptor ring thereby joining said afocal lens assembly to said night vision device.

9. The assembly according to claim 8, wherein said first adaptor ring threadably engages said night vision device.

10. The assembly according to claim 8, wherein said second adaptor ring threadably engages said afocal lens assembly.

11. A method of increasing the optical power of a night vision device, comprising the steps of:

providing a night vision device having an objective lens aligned along an optical path within a housing;

providing an afocal lens arrangement of a predetermined power of magnification;

joining a first adaptor ring to an exterior surface of said housing of said night vision device;

joining a second adaptor ring to said afocal lens arrangement; and coupling said first adaptor ring to said second adaptor ring whereby said afocal lens arrangement is aligned along said optical path and magnifies images entering said objective lens.

12. The method according to claim 11, wherein said step of joining said first adaptor ring to said night vision device includes threadably attaching said first adaptor ring to said night vision device.

13. The method according to claim 12, wherein said step of joining said second adaptor ring to said afocal lens arrangement includes threadably attaching said second adaptor ring to said afocal lens arrangement.

14. The method according to claim 13, wherein said step of coupling said first adaptor ring to said second adaptor ring includes threadably joining said first adaptor ring to said second adaptor ring.

15. The method according to claim 11 wherein said first adaptor ring has a first region of a first diameter, a second region of a second diameter and a transition region having a diameter larger than said first diameter and no larger than said second diameter, wherein said transition region abuts against said night vision device when said first region of said first adaptor ring is joined to said night vision assembly, thereby transferring a stress applied to said first adaptor ring to the night vision device.

* * * * *